United States Patent
Taskiran-Cyr

(10) Patent No.: US 9,100,696 B2
(45) Date of Patent: *Aug. 4, 2015

(54) SYSTEM AND METHOD FOR UPGRADING A MULTIPROCESSOR SET-TOP BOX DEVICE WITH A MONOLITHIC FIRMWARE IMAGE

(71) Applicant: BROADCOM CORPORATION, Irvine, CA (US)

(72) Inventor: Pinar Taskiran-Cyr, Doraville, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,126

(22) Filed: Jul. 26, 2013

(65) Prior Publication Data

US 2014/0007176 A1 Jan. 2, 2014

Related U.S. Application Data

(63) Continuation of application No. 12/273,476, filed on Nov. 18, 2008, now Pat. No. 8,544,053.

(60) Provisional application No. 61/006,055, filed on Dec. 17, 2007, provisional application No. 61/006,054, filed on Dec. 17, 2007.

(51) Int. Cl.
*H04N 7/173* (2011.01)
*H04N 21/443* (2011.01)
*H04N 21/236* (2011.01)
*H04N 21/258* (2011.01)
*H04N 21/426* (2011.01)
*H04N 21/61* (2011.01)
*H04N 21/81* (2011.01)

(52) U.S. Cl.
CPC .......... *H04N 21/443* (2013.01); *H04N 7/17318* (2013.01); *H04N 21/23617* (2013.01); *H04N 21/25816* (2013.01); *H04N 21/42676* (2013.01); *H04N 21/6168* (2013.01); *H04N 21/8166* (2013.01)

(58) Field of Classification Search
CPC combination set(s) only.
See application file for complete search history.

(56) References Cited

U.S. PATENT DOCUMENTS

| | | |
|---|---|---|
| 6,766,353 B1 | 7/2004 | Lin et al. |
| 2007/0101417 A1 | 5/2007 | Kim et al. |
| 2008/0256527 A1 | 10/2008 | Lee et al. |
| 2009/0125958 A1 | 5/2009 | Siripunkaw et al. |

OTHER PUBLICATIONS

Office Action dated May 9, 2012, in U.S. Appl. No. 12/273,476.

*Primary Examiner* — Chenea Smith
(74) *Attorney, Agent, or Firm* — Sterne, Kessler, Goldstein & Fox P.L.L.C.

(57) ABSTRACT

A system and method for downloading a code image at a set-top gateway host that includes an embedded set-top box and an embedded cable modem. The embedded set-top box and the embedded cable modem interact so that each leverages the resources of the other, thereby minimizing the functionality that must be built into each.

20 Claims, 22 Drawing Sheets

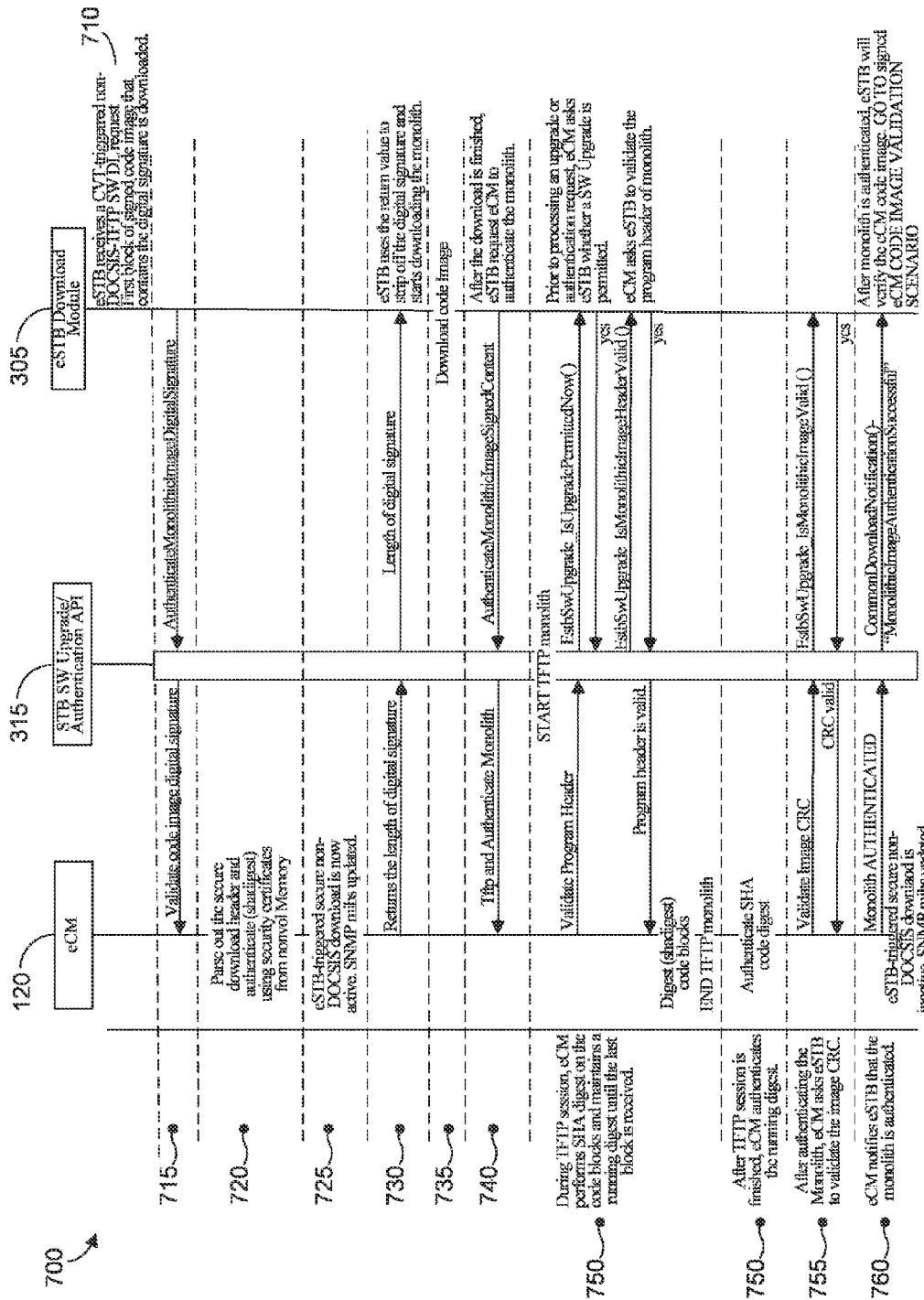

| REQUEST MESSAGE | eSTB ---> eCM | |
|---|---|---|
| | File Type | These 8 bits are laid out as follows:<br>bit number (7=MSB 0=LSB)<br><br>`7        4 3           0`<br>`| Type    | sections  |`<br><br>4 LSBs of 'File Type' indicate the sections of the file to be processed.<br>0x1 - Digital Signature<br>0x2 - Content<br><br>4 MSBs of 'File Type' indicate the type.<br>0x1 - Monolith<br>0x2 - eCM<br>0x3 - CVT |
| | Flags | These 8 bits are laid out as follows:<br>bit number (7=MSB 0=LSB)<br><br>`7          4 3           0`<br>`| TFTP Flag | Request Type |`<br><br>4 LSBs of 'Flags' indicate the request.<br>0x1 - Authenticate<br>0x2 - Upgrade<br><br>4 MSBs of 'Flags' indicate whether a TFTP Server Address is included or not.<br>0x0 - TFTP Srv. Addr. not included<br>0x1 - TFTP Srv. Addr. included |
| | If (TFTP Server Address Included Flag == '1'){ | |
| | TFTP Server Address | IP Address of the TFTP Server from which the file to be processed will be retrieved. |
| | } | |
| | File Path Or Buffer Length | This 32-bit field contains the length of the attached buffer. |
| | File Path Or Buffer | If a TFTP server address is included then this buffer contains the path to the image file to be processed, otherwise this buffer contains the file to be processed (e.g. digital signature). |

FIG. 16

| RESPONSE MESSAGE | eCM --> eSTB | |
|---|---|---|
| | Return Code | This 32-bit field indicates whether the request was successfully received/processed by the server or not. Note that depending on the type of the request the server may process the request immediately and send the result of the process in the response message or the server may respond to ack the retrieval of the request and notify the client of the result of the process asynchronously. |
| | Return Value | Depending on the request type, this 32-bit field may contain a value like the length of the digital signature. |

FIG. 17

| NOTIFICATION MESSAGE | eCM --> eSTB | |
|---|---|---|
| | Return Code | This 32-bit field contains the result of a client request that had to be asynchronously processed by the server (e.g., eCM's firmware upgrade). |

FIG. 18

SYSTEM AND METHOD FOR UPGRADING A MULTIPROCESSOR SET-TOP BOX DEVICE WITH A MONOLITHIC FIRMWARE IMAGE

CROSS-REFERENCE TO RELATED APPLICATIONS/INCORPORATION BY REFERENCE

This is a continuation of U.S. patent application Ser. No. 12/273,476, filed Nov. 18, 2008, the disclosure of which is incorporated herewith in its entirety. In addition, the parent application Ser. No. 12/273,476 claims the benefit of U.S. Provisional Application No. 61/006,055, filed on Dec. 17, 2007, and U.S. Provisional Application No. 61/006,054, filed on Dec. 17, 2007, both of which are incorporated herein by reference in their entireties.

BACKGROUND OF THE INVENTION

1. Field of the Invention

The invention described herein relates to the download of code images.

2. Background Art

In a set-top gateway host, several components may be present through which software upgrades can be received as downloads. For example, a Data Over Cable Service Interface Specification (DOCSIS) Set-top Gateway (DSG) host device that complies with OpenCable Host Device 2.0 Core Functional Requirements (OCHD2) includes an embedded DOCSIS cable modem (eCM) and an embedded set-top box (eSTB). Depending on the connection between the host and the server providing the download, some downloads may be received through the eCM only. An example of this is trivial file transfer protocol (TFTP) code downloads. Such downloads can only be done by cable modems. Other downloads may take place at the eSTB, such as a carousel download of a set-top image through a non-DOCSIS channel.

In either case, the eCM and the eSTB may need to communicate with each other. There may be security processing requirements, for example, wherein the eCM is required to perform validation and/or authentication operations on downloaded code and related data that otherwise is stored at the eST13, In other cases, the eSTB may have to request that the eCM download a set-top image. Moreover, design constraints may dictate that some functionality and resources reside at one or the other, but not both. Again, this would require that the eCM and eSTB cooperate to process downloads securely.

Hence there is a need for a system and method by which the eCM and eSTB in a set-top host device communicate efficiently in order to securely and cooperatively process downloads of code images.

BRIEF DESCRIPTION OF THE DRAWINGS/FIGURES

FIG. 7 illustrates the interaction between an eCM and an eSTB during the secure download of FIG. 5, according to an embodiment of the invention.

FIG. 16 illustrates the format of a request message, according to an embodiment of the invention.

FIG. 17 illustrates the format of a response message, according to an embodiment of the invention.

FIG. 18 illustrates the format of a notification message, according to an embodiment of the invention.

Further embodiments, features, and advantages of the present invention, as well as the operation of the various embodiments of the present invention, are described below with reference to the accompanying drawings.

DETAILED DESCRIPTION OF THE INVENTION

The present invention relates generally to a method and system for the download and verification of code images in a multi-processor set-top device, wherein the eCM and eSTB communicate (i.e., cooperate) in order to process the download securely. The invention also provides for the secure upgrade of the Software of an embedded cable modem that runs on a processor other than the host processor.

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

In an embodiment of the invention, a DOCSIS Set-top Gateway (DSG) Host device that complies with OpenCable Host Device 2.0 Core Functional Requirements (OCHD2) includes an embedded DOCSIS cable modem (eCM) and an embedded set-top box (eSTB). The OpenCable Common Download specification (CDL 2.0) defines a standard secure software download (SSD) protocol for downloading new code images to such host devices. In this document, the code image that is used for the overall host device will be referred as the 'monolithic image'. The term 'non-DOCSIS channel' will be used to refer to a channel that the eSTB uses to download a monolithic image. A non-DOCSIS channel that is used for performing software upgrade can be, for example, a Forward Application Transport (FAT) channel or a DSG tunnel that is carried within a DOCSIS channel.

The download can be triggered through the eCM or through the eSTB. The monolithic image can be delivered to the host device through the eCM via the trivial file transfer protocol (TFTP). Alternatively, the monolithic image can be delivered through the eSTB using the digital storage medium command and control (DSM-CC) data carousel method.

Figure 1:
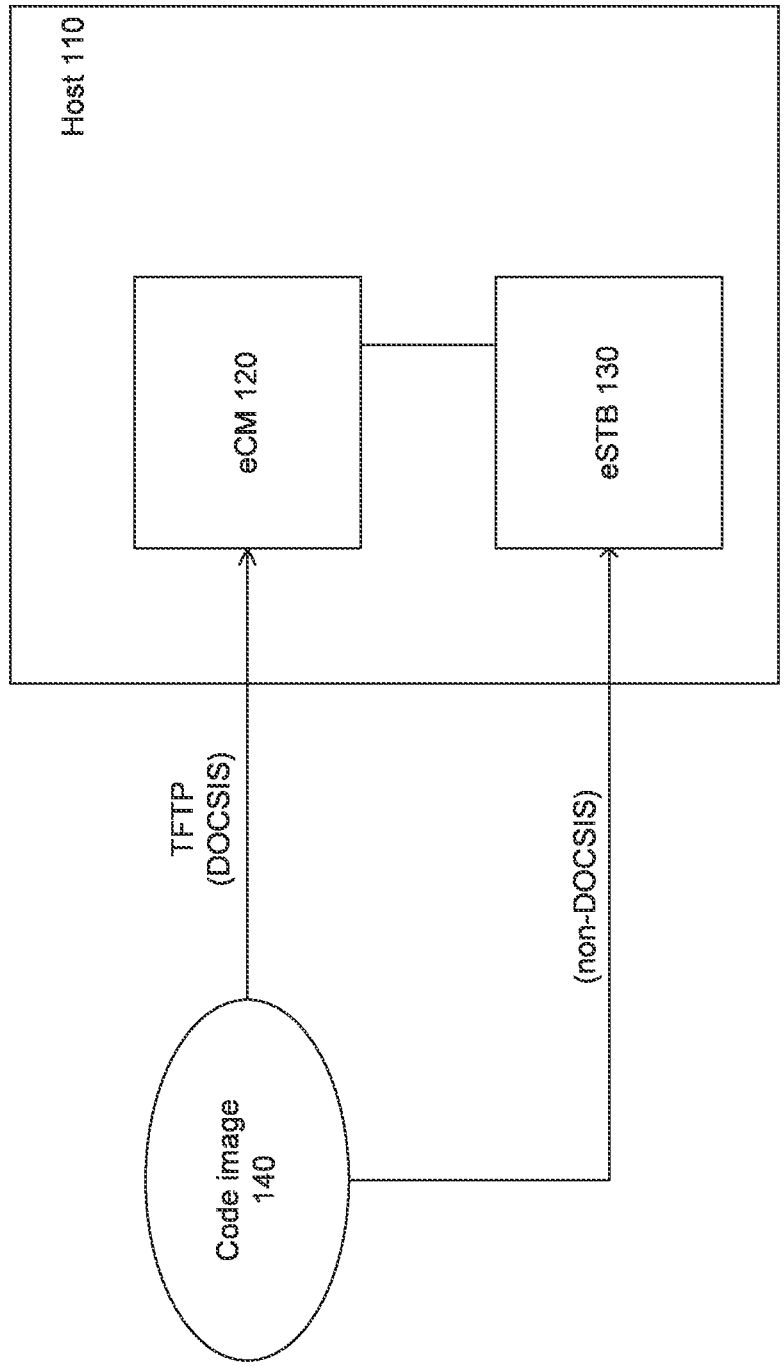
FIG. 1 is a block diagram illustrating the context of an embodiment of the invention.

The downloading of a code image to a host is illustrated in FIG. 1. The host 110 includes an eCM 120 and an eSTB 130. A code image 140 can be transferred to eCM 120 in host 110 using TFTP. In other circumstances the image 140 can be transferred to eSTB 130 in host 110. The eCM 120 and eSTB 130 interact to process such downloads securely in a manner described in greater detail below.

When the TFTP method is used for download delivery, the eCM performs the TFTP using its own source IP address since the DOCSIS infrastructure is configured to permit TFTP code downloads to be performed only by cable modems. In a multi-processor set-top device where the eCM application runs on the cable modem chip and eSTB application runs on a video processing chip, the monolithic image is typically stored in the program storage device such as a flash memory that is controlled by the video processing chip. As the eCM is downloading the monolithic image via TFTP, it transfers each segment of the monolith to the eSTB. This is because the eCM does not typically have enough RAM to hold the monolithic image and transfer it to the eSTB after the download is finished.

This invention includes a system and method to transfer the monolithic image from the eCM's memory to the eSTB as the monolithic image is being downloaded. In an embodiment of the invention, the client-server model is used to manage this image transfer. In this model, the client runs on the eCM and the server runs on the eSTB; the client and server communicate via a proprietary socket protocol.

In an embodiment, when a code download is triggered, the eCM asks the eSTB whether a monolith software upgrade is permitted. If the eSTB allows the upgrade, the eCM first authenticates the digital signature of the monolith. The eCM then transfers the first segment of the monolith to the eSTB and requests that the eSTB validate the program header of monolith. If the eSTB cannot validate the program header, the eCM aborts the download and updates the DOCSIS simple network management protocol (SNMP) management information base (MIB) objects. This allows the set-top device to preserve processing resources by timely aborting the download of an incompatible image. This is useful since the size of a monolith can be quite large. Assuming that the header is successfully validated, the transfer of the segments of the monolithic image to the eSTB continues.

After the download is completed, the eCM asks the eSTB to validate the image, e.g., run a cyclic redundancy check (CRC), since the eCM must update DOCSIS SNMP MIB objects and correctly report the results of the download.

The monolith typically contains the eCM image, which may be signed or unsigned depending on the vendor. If it is signed, then eCM must authenticate its image. Moreover, depending on the layout, eCM may be set to boot from its own program storage device such as a flash device. In this case, eCM would have to upgrade its software with the new eCM image extracted from the monolith.

The system and method described herein provide for handling the software upgrade of a multi-processor set-top device whether the cable modem chip may control its own flash device or not.

Figure 2:
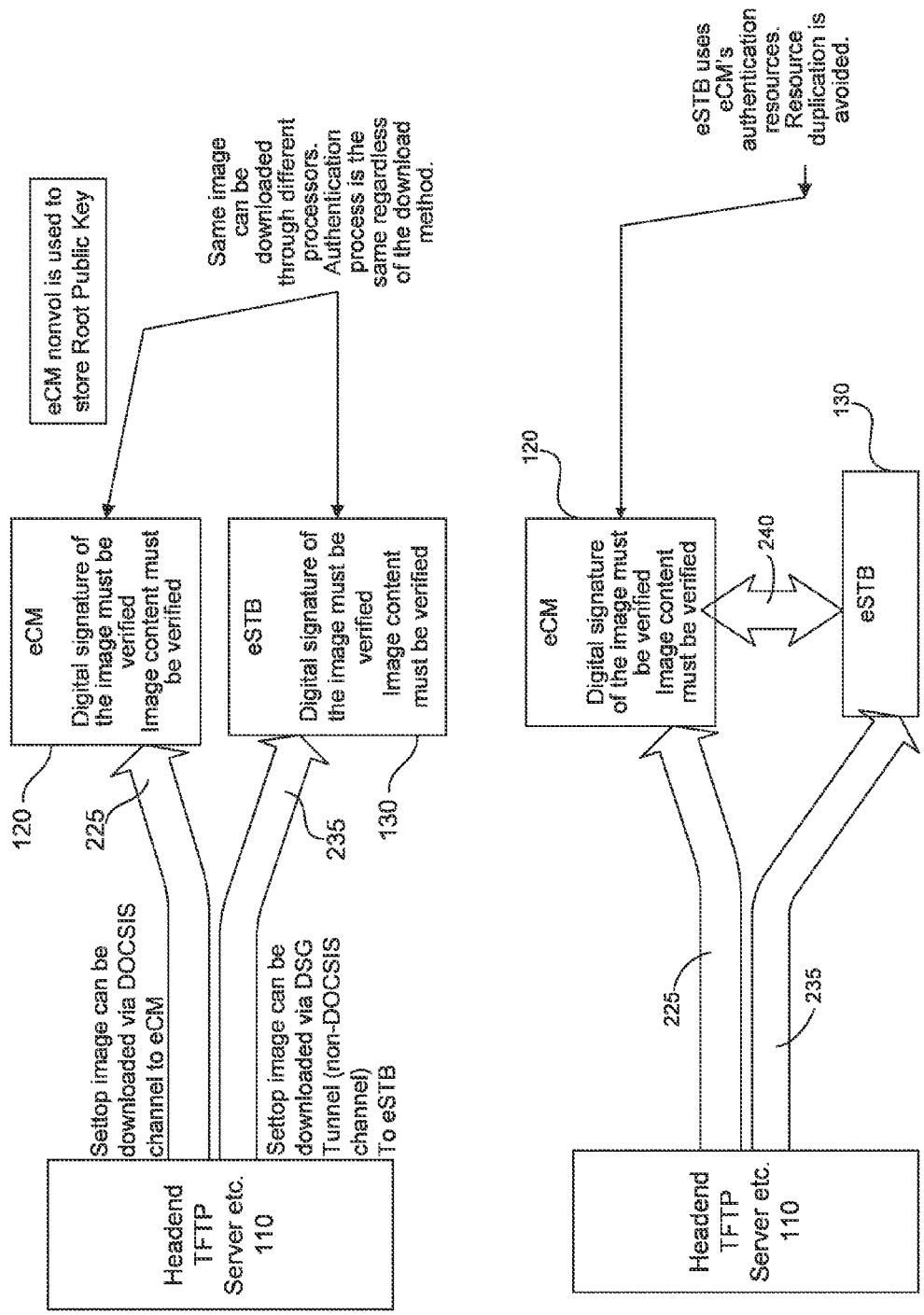
FIG. 2 is a block diagram generally illustrating the processing of an embodiment of the invention.

The processing of an embodiment of the invention is illustrated in greater detail in FIG. 2. A headend 210, is shown transferring a code image to a host. In particular, the image is downloaded to either of eCM 120 or eSTB 230. The download to eCM 120 is a trivial file transfer protocol (TFTP) download performed through a DOCSIS channel 225. The download to eSTB 230 is a DSM-CC (Digital Storage Medium—Command and Control) data carousel download where the carousel is carried in a DSG Tunnel or Forward Application Transport (FAT) channel 235. Hence the download can be sent to either of two different processors. If the download is sent to eSTB 230, the security requirements of a secure download are satisfied using the information and resources of eCM 120, such as the security certificates that may be stored in non-volatile storage in eCM 120. This utilization of the security-related resources and information of eCM 120 is accomplished through interaction 240, which will be described in greater detail below.

Figure 3:
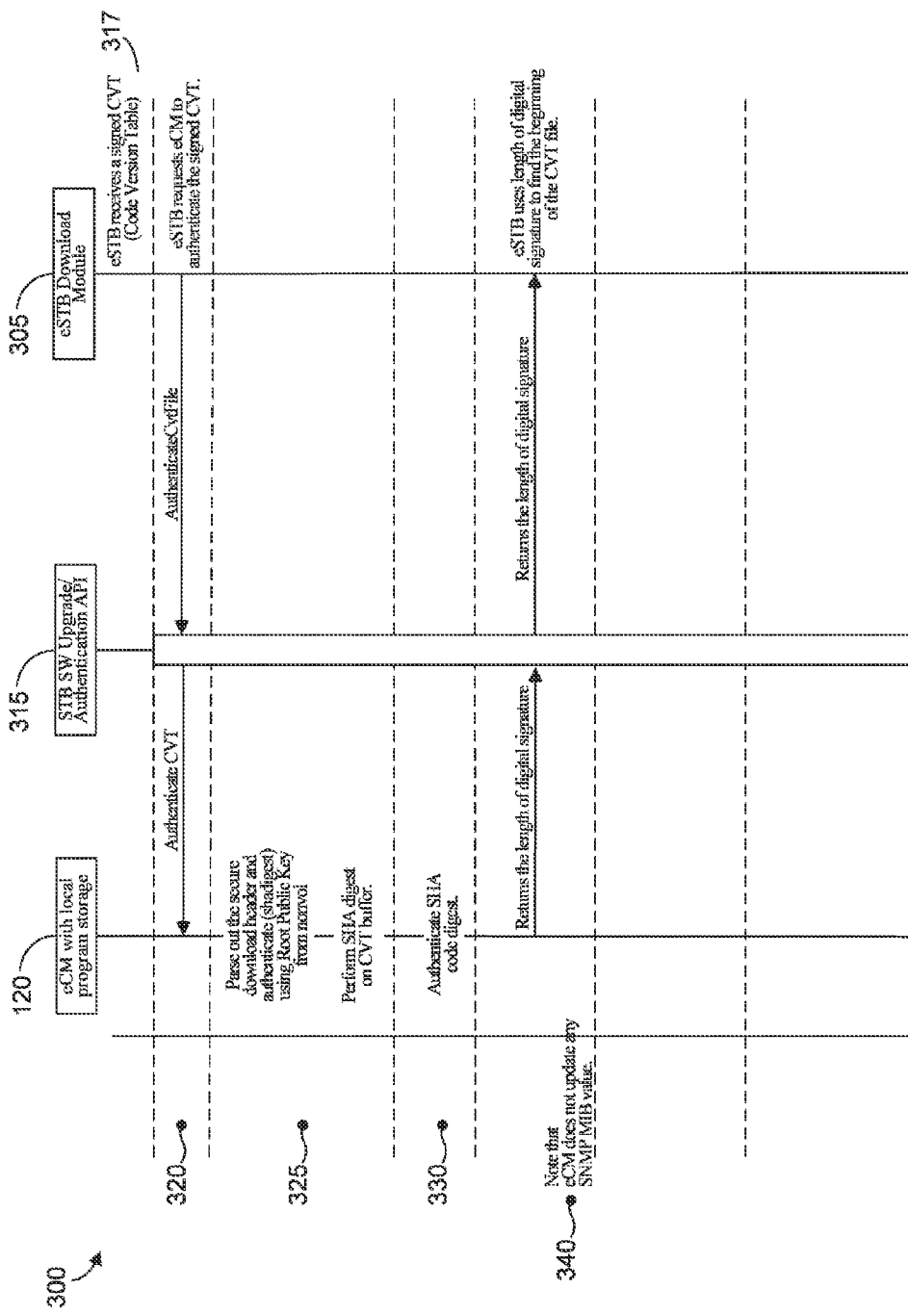
FIG. 3 illustrates processing related to a code version table (CVT)-triggered carousel download, according to an embodiment of the invention.

FIG. 3 shows a portion of interaction 240, according to an embodiment of the invention. In particular, this figure shows a process 300. This represents the communication between a download module 305 of eSTB 130 and an eCM 120 during authentication of a code version table (CVT), where the authentication process conforms to the SHA-1 authentication standard. Note that in the illustrated embodiment, this communication takes place via a software upgrade/authentication application program interface (API) 315.

In step 317, the eSTB download module 305 receives a signed CVT from the headend 210. In step 320, the eSTB requests that the eCM 120 authenticate the signed CVT. This request is in the form of a command "AuthenticateCvtFile" sent to API 315. The authentication command is received at eCM 120 through API 315. In step 325, the header of the secure download header is parsed and authentication by eCM 120 begins, using the security certificates stored in non-volatile memory of eCM 120. An SHA digest process is then performed on the CVT buffer contents. In step 330, eCM 120 authenticates the SHA code digest. In step 340, eCM 120 returns the length of the digital signature. The eSTB then uses this length to find the starting point of the CVT file.

Note that in the illustrated embodiment, the eCM does not update any SNMP MIB objects in the process 300.

Figure 4:
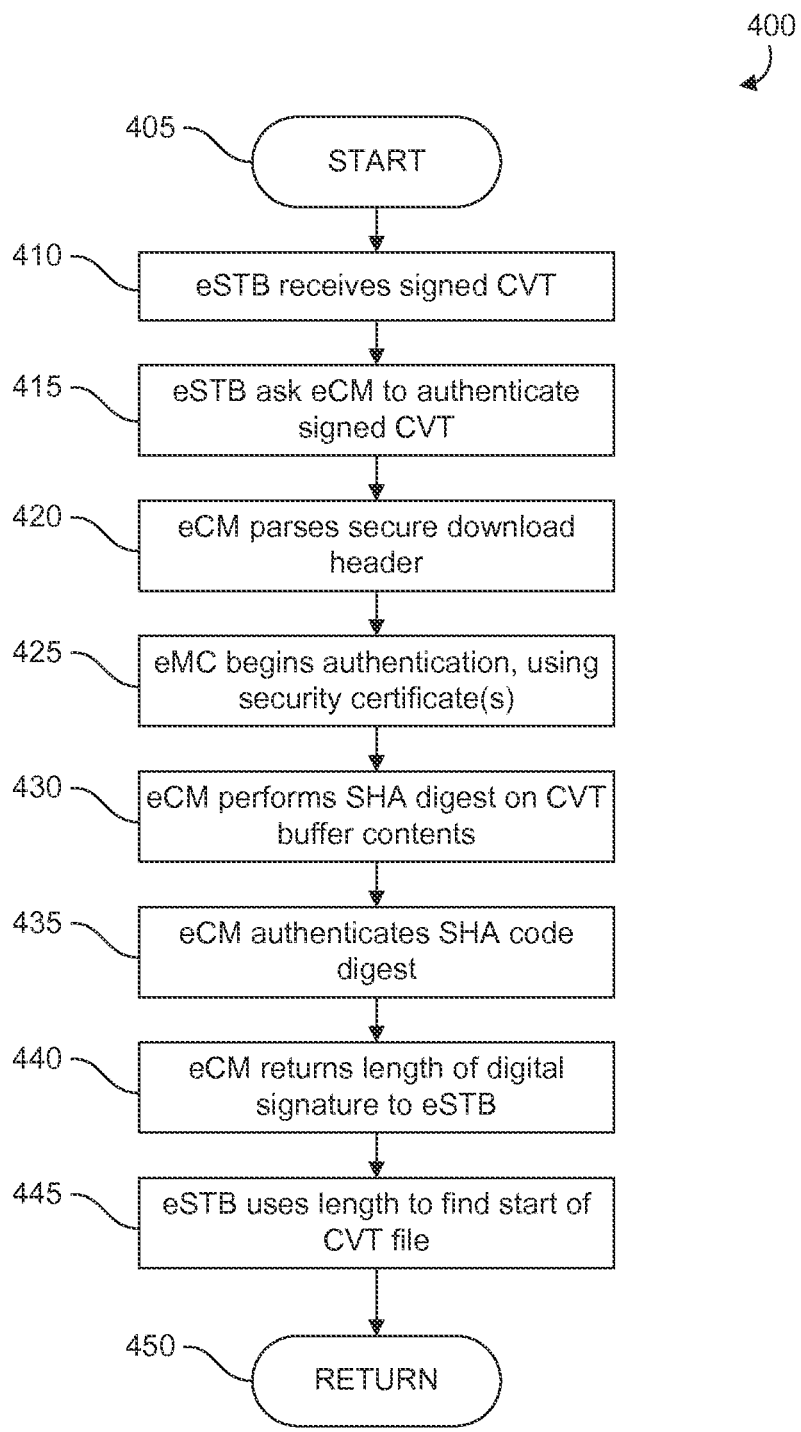
FIG. 4 is a flowchart illustrating the processing of FIG. 3, according to an embodiment of the invention.

The processing of FIG. 3 is illustrated as a flowchart in FIG. 4. The process begins at step 405. At step 410, the eSTB receives the signed CVT. In step 415, the eSTB requests that the eCM authenticate the signed CVT. In step 420, the eCM parses the secure download header associated with the signed CVT. In step 425, the eCM starts authentication. In an embodiment of the invention, this authentication process uses one or more security certificates at the eCM. In step 430, the eCM performs the authentication process, e.g., a SHA digest operation, on the contents of the buffer that holds the CVT. In step 435, the eCM authenticates the code digest that results from the authentication process. In step 440, the eCM returns, to the eSTB, the length of the digital signature from the signed CVT. In step 445, the eSTB uses this length to find the start of the CVT file in the signed. CVT. The process concludes at step 450.

Figure 5:
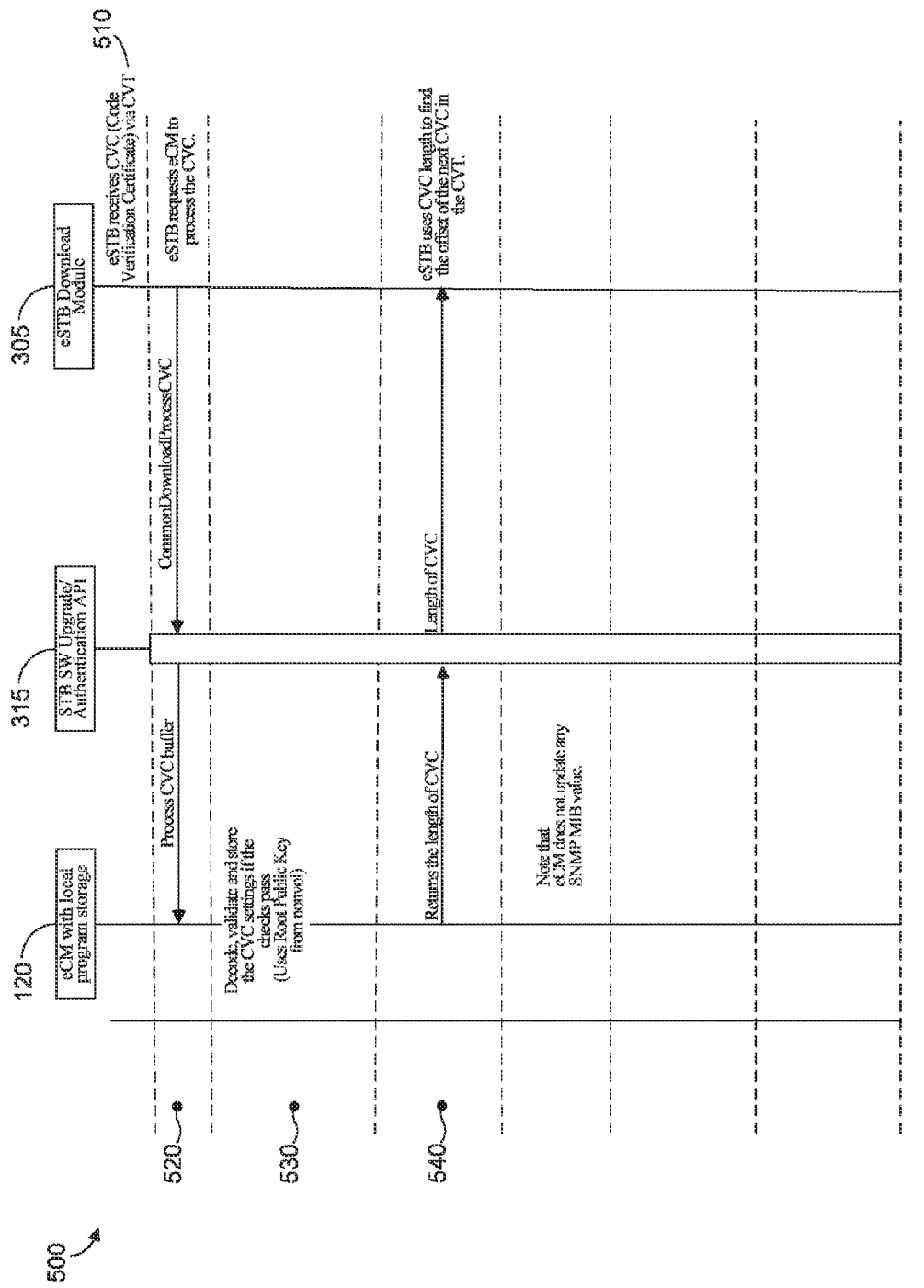
FIG. 5 illustrates processing related to a CVT-triggered download over a DOCSIS channel using TFTP, according to an embodiment of the invention.

FIG. 5 further illustrates interaction 240 according to an embodiment of the invention. This figure shows a process 500, the processing of a code verification certificate (CVC). In step 510, the eSTB receives a CVC. In step 520, the eSTB requests that the eCM 120 process the CVC buffer. Again, this request is made by the eSTB in the form of a command to API 315. In the illustrated embodiment, this command is called "CommonDownloadProcessCVC." In step 530, the eCM 120 decodes and validates the CVC settings, and stores the CVC settings if the validation is successful. In step 540, the eCM 120 returns the length of the CVC to the eSTB. The eSTB then uses the CVC length to find the offset of the next CVC of the CVT.

Again, note that in the illustrated embodiment, the eCM does not update any SNMP MIB objects in process 500.

Figure 6:
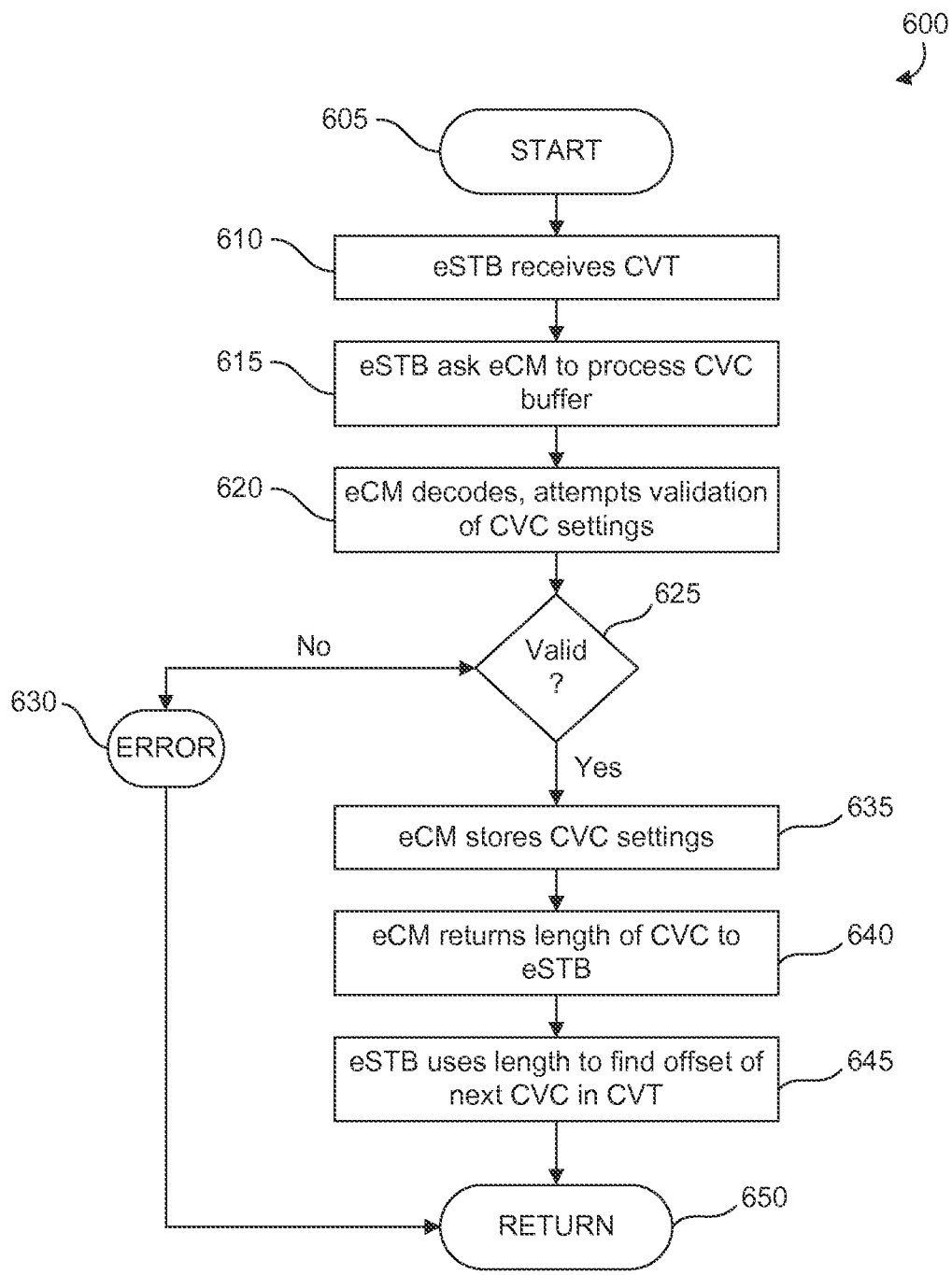
FIG. 6 is a flowchart illustrating the processing of FIG. 5, according to an embodiment of the invention.

The processing of FIG. 5 is illustrated as a flowchart in FIG. 6. The process begins at step 605. In step 610, the eSTB receives the CVC. In step 615, the eSTB asks the eCM to process the contents of the buffer containing the CVC. In step 620, the eCM decodes and attempts validation of the CVC settings. In step 625, a determination is made as to whether the CVC settings are valid. If not, an error condition is noted in step 630 and the process concludes at step 650. If the settings are valid, the process continues at step 635, where the eCM stores the CVC settings. In step 640, eCM returns the length of the CVC to the eSTB. In step 645, the eSTB uses this length to find the offset of the next CVC in the CVT.

FIG. 7 further illustrates interaction 240 according to an embodiment of the invention. This figure shows a process 700, the processing of a CVT-triggered carousel download. In step 710, the eSTB receives a CVT-triggered software download request. In the illustrated embodiment, this request is a DSM-CC data carousel download request. In step 715, the eSTB asks the eCM 120 to validate the code image's digital signature. This request is sent in the form of a command to the API 315. In step 720, eCM 120 parses the secure download header and authenticates it, using one or more security certificates stored in non-volatile memory of eCM 120. In step 725, the eSTB-triggered secure download is now active, and SNMP MIB objects are updated. In step 730, the eCM 120 returns the length of the digital signature to the eSTB, which uses this value to strip off the digital signature and start downloading a monolithic code image. In step 735, the code image is downloaded to the eSTB.

In step 740, the eSTB asks eCM 120 to authenticate the monolithic code image. Again, this request takes the form of a command to the API 315. In step 745, eCM 120 asks the eSTB whether a software upgrade is permitted. If so, the process continues. The eCM 120 then asks the eSTB to validate the program header of the monolithic image. If the header is valid, the eCM 120 is so informed. The TFTP session starts, during which the eCM 120 performs the SHA digest process on the received code blocks. A running digest is maintained until the last block is received. The TFTP session then concludes.

In step 750, the eCM 120 authenticates the running digest. In step 755, after the code image has been authenticated, eCM 120 asks the eSTB to validate the image cyclic redundancy code (CRC). This request is conveyed to the eSTB via the API 315. If the CRC is successfully validated, an indication to that effect is communicated back to eCM 120. The eCM 120 then tells the eSTB that the monolithic code image has been authenticated in step 760. SNMP MIB objects are then updated as appropriate.

Note that while the above processes are described in terms of SHA-1 authentication, the concepts of the invention can be implemented using other forms of authentication as well.

Figure 8A:
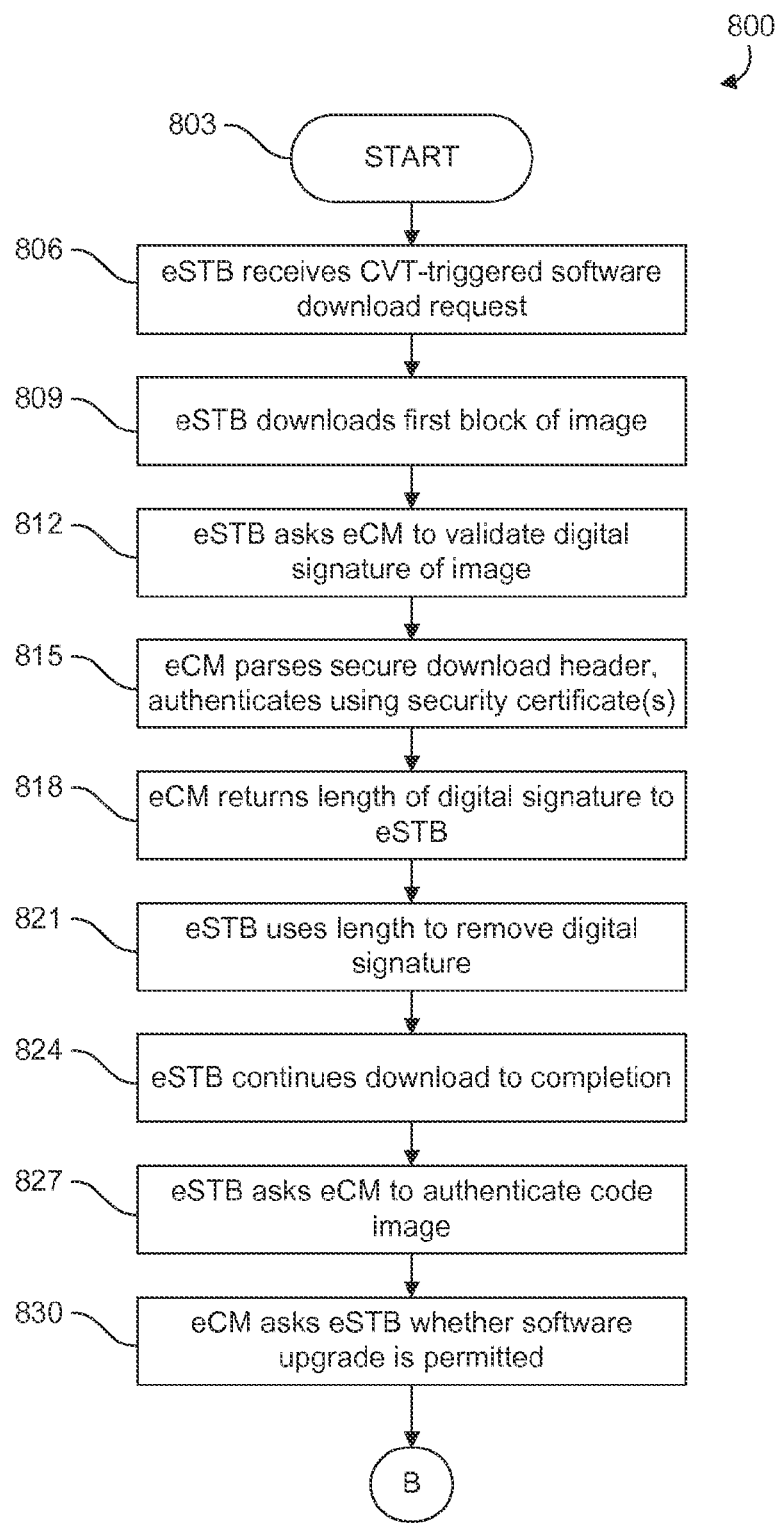
FIGS. 8A-8C illustrate the processing of FIG. 7 in the form of a flowchart 800. The process begins at step 803 of FIG. 8A.
Figure 8B:
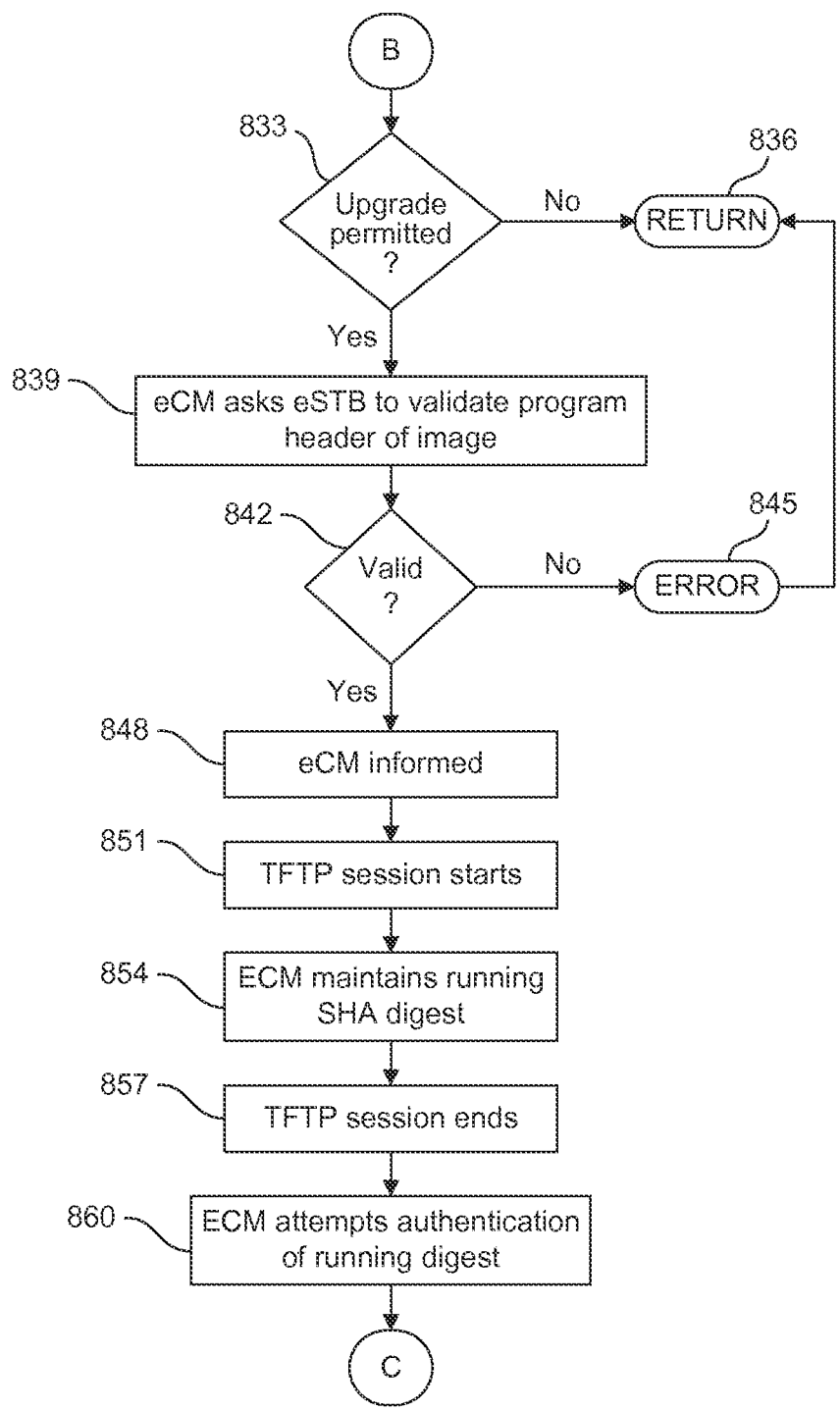
Figure 8C:
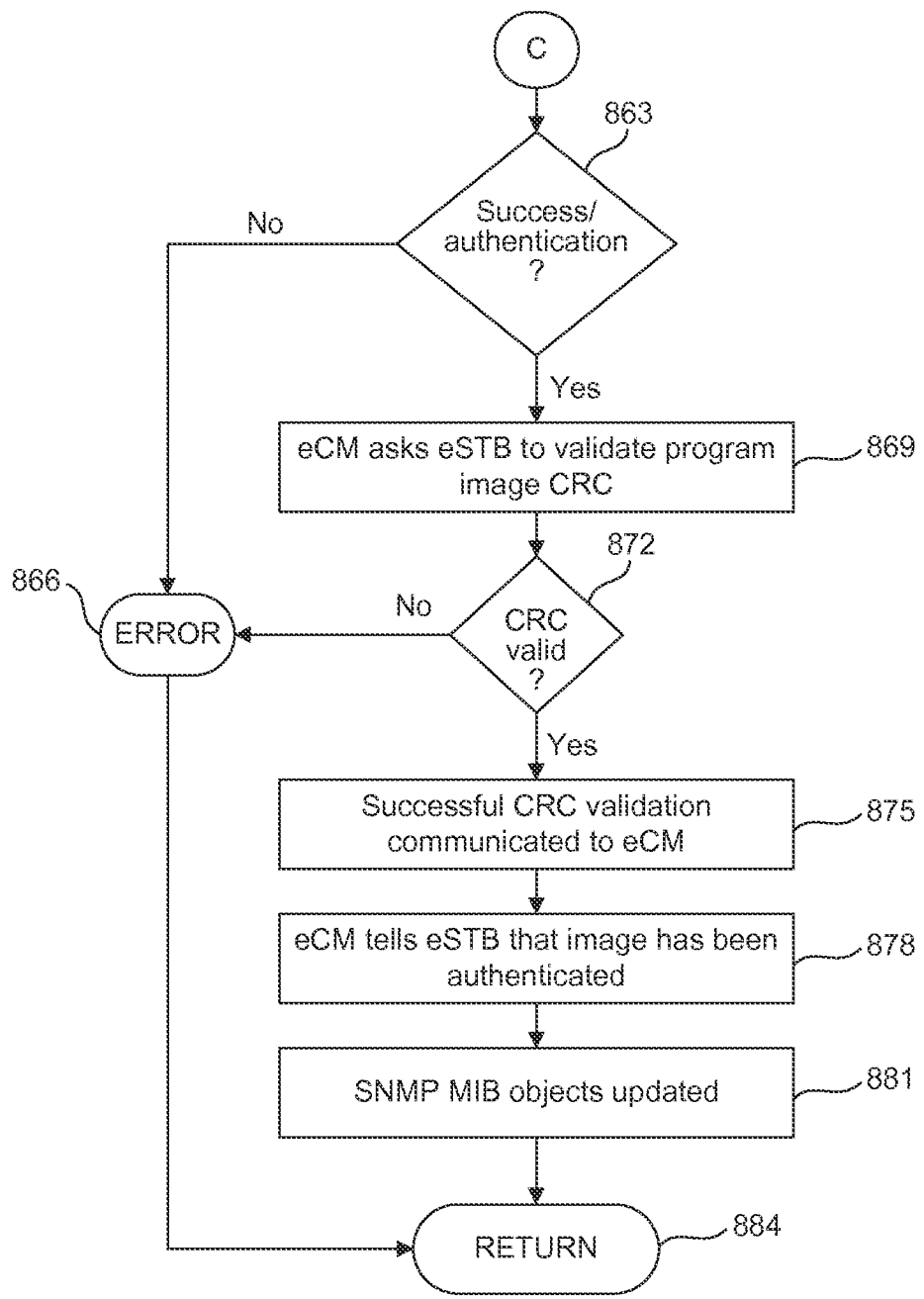

FIGS. 8A-8C illustrate the processing of FIG. 7 in the form of a flowchart 800. The process begins at step 803 of FIG. 8A. In step 806, the eSTB receives the CVT-triggered download request. In step 809, the eSTB downloads the first block of the monolithic image. In step 812, the eSTB asks the eCM to validate the digital signature of this image. In step 815, the eCM parses the secure download header in the first block of the image. The header is authenticated using the security certificates held at the eCM, in an embodiment of the invention. In step 818, the eCM returns the length of the digital signature to the eSTB. In step 821, the eSTB uses this length to remove the digital signature from the monolithic image.

In step 824, the eSTB continues to download the monolithic image. In step 827, the eSTB asks the eCM to authenticate the monolithic image. In step 830, the eCM asks the eSTB whether a software upgrade is permitted. Continuing to FIG. 8B, a determination is made in step 833 as to whether such an upgrade is permitted. If not, the process ends at step 836. If an upgrade is permitted, the process continues at step 839. Here, the eCM asks the eSTB to validate the program header of the monolith. If the header is not valid as determined in step 842, an error condition is noted in step 845. If the header is valid, the process continues at step 848, where the eCM is informed of the validity of the image header.

In step 851, the TFTP session starts. In step 854, the eCM maintains a running SHA digest during the session. In step 857, the TFTP session ends. In step 860, the eCM attempts to authenticate the running digest. Continuing to FIG. 8C, a determination is made in step 863 as to whether the authentication was successful. If so, then in step 869 the eCM asks the eSTB to validate the error detection code of the image. In the illustrated embodiment, this code is a cyclic redundancy code (CRC). In step 872, a determination is made as to whether the CRC is valid. If not, an error condition is raised in step 866. If the CRC is valid, the process continues at step 875, where the successful validation of the CRC is communicated to the eCM. In step 878, the eCM informs the eSTB that the image has been authenticated. In step 881, the SNMP MIB objects are updated. The process concludes at step 884.

Figure 9:
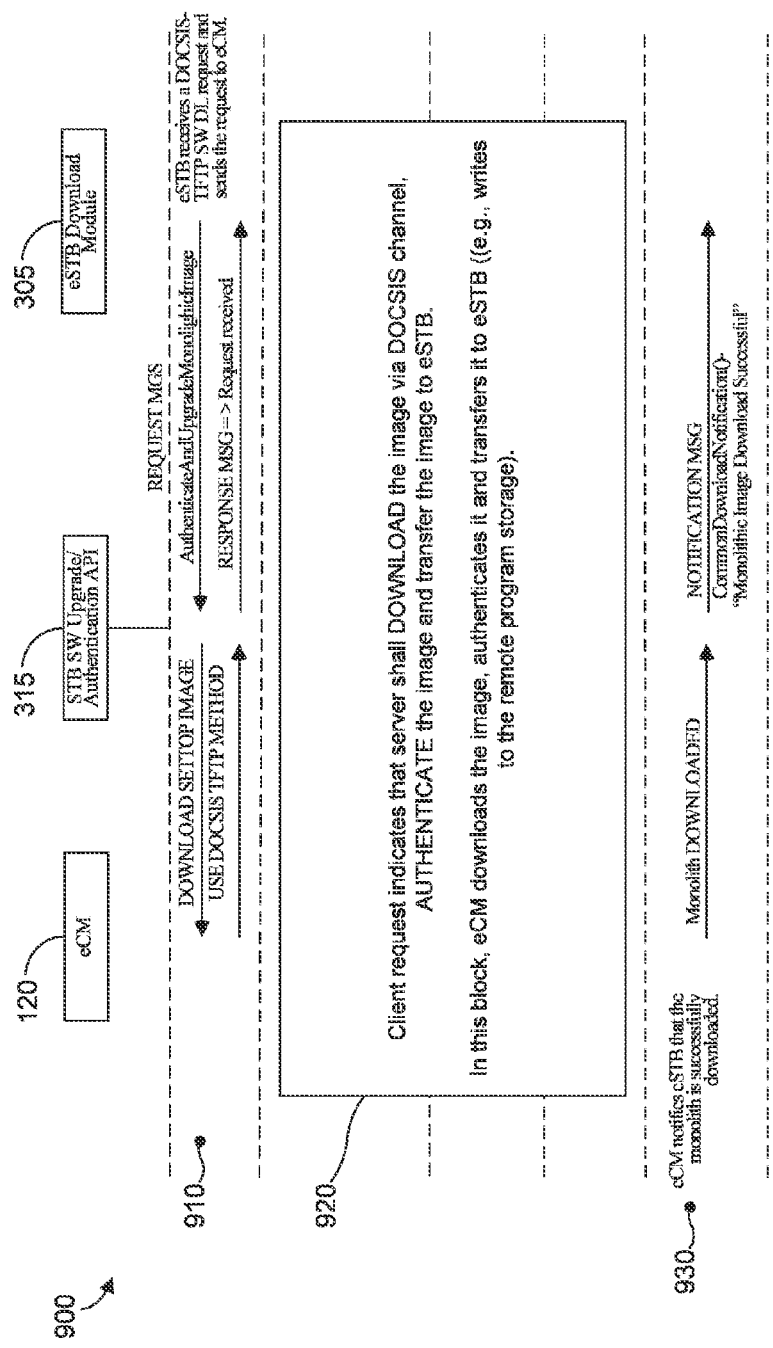
FIG. 9 illustrates processing related to a CVT-triggered download over a DOCSIS channel using TFTP, according to an embodiment of the invention.

A CVT-triggered download can take place over a DOCSIS channel using TFTP. This is shown in FIG. 9, according to an embodiment of the invention. In step 910, eSTB download module 305 receives the download request and sends the request to eCM 120. This takes the form of a REQUEST message that is sent via API 315, asking that the eCM 120 authenticate and upgrade the monolithic image. In step 920, this request (effectively a client request) indicates that the eCM 120 (acting as a server) is to download the monolithic image via the DOCSIS channel, authenticate the monolithic image, and transfer the monolithic image to eSTB download module 305. The eCM 120 does so, writing the monolithic image to remote program storage at eSTB download module 305. In step 930, eCM 120 notifies eSTB download module 305 that the monolithic image has been successfully downloaded. This is received via API 315 as an appropriate NOTIFICATION message.

Figure 10:
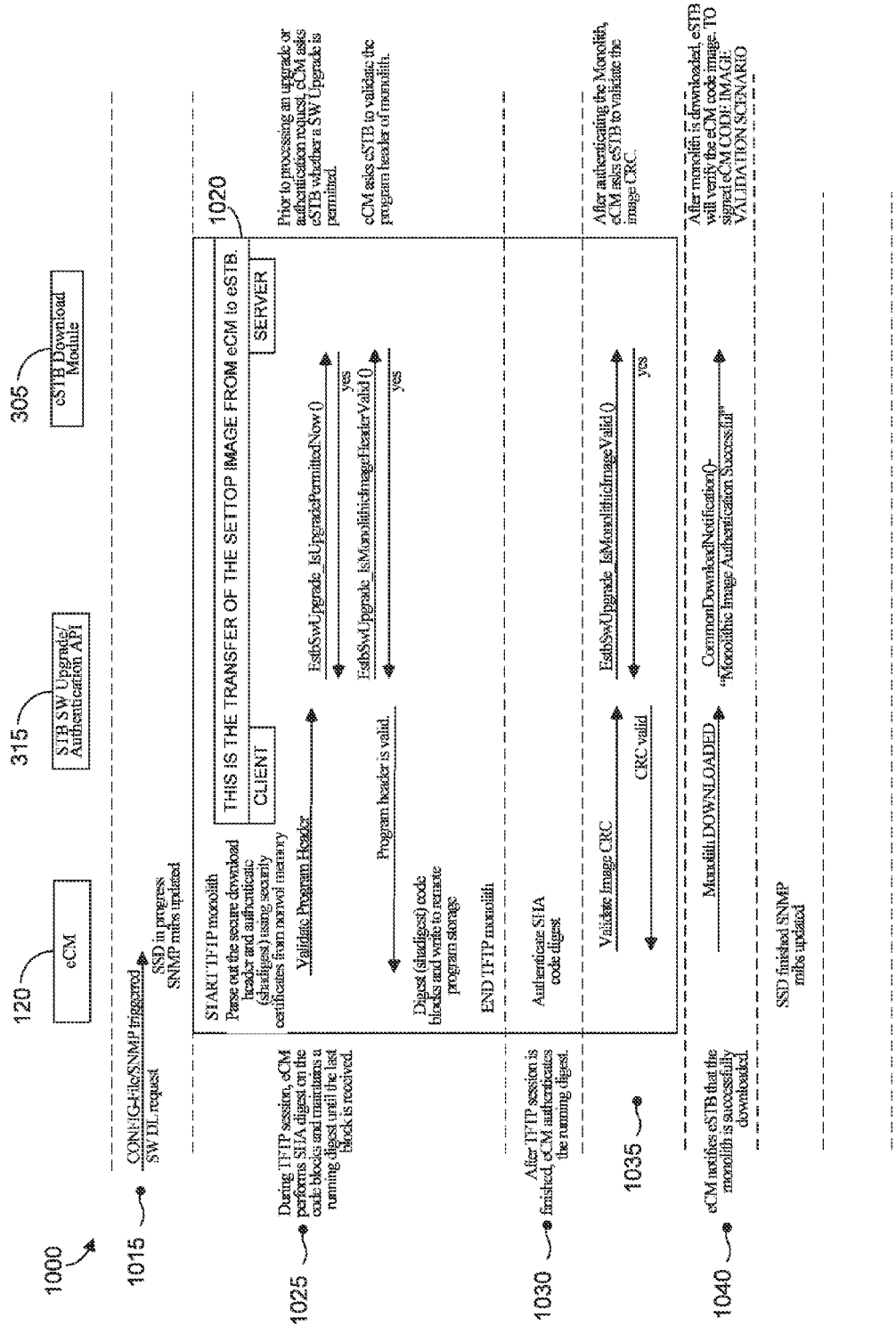
FIG. 10 illustrates the interaction between an eCM and an eSTB during the secure download of FIG. 9, according to an embodiment of the invention.

FIG. 10 illustrates the interactions that take place between eCM 120 and eSTB download module 305 during the secure download of the monolithic image in the previous example, according to an embodiment of the invention. The interactions between eCM 120 and eSTB download module 305 contained in box 1020 of FIG. 10 include the transfer of the monolithic image from eCM 120 to eSTB download module 305.

The download to the host was triggered by a configuration file or via SNMP as shown in step 1015. In step 1025, the TFTP transfer of the monolithic image begins. Here, eCM 120 assumes the role of a client with respect to eSTB 130, while the eSTB assumes the role of a server. eCM 120 parses out the secure download header, eCM 120 asks eSTB download module 305 to validate the program header. This request is made via API 315 in this embodiment. The eSTB download module 305 then determines whether a software upgrade is permitted. If so, eSTB download module 305 proceeds to attempt validation of the header of the monolithic image. If the validation succeeds, this is conveyed to eCM 120, and the transfer of the monolithic image to eSTB download module 305 proceeds.

During the TFTP session, eCM 120 performs an SHA digest operation on the received code blocks and maintains a running digest until the last block is received. The code blocks undergo the digest process, then are written to remote program storage.

In step 1030, after the TFTP session is over, eCM 120 authenticates the running digest. In step 1035, eCM 120 asks eSTB download module 305 to validate the CRC of the monolithic image. Again, this request proceeds via API 315. If validation is successful, eCM 120 is so informed. In step 1040, eCM 120 notifies eSTB download module 305 that the monolithic image has been successfully downloaded. SNMP MIB objects are then updated as necessary.

Figure 11A:
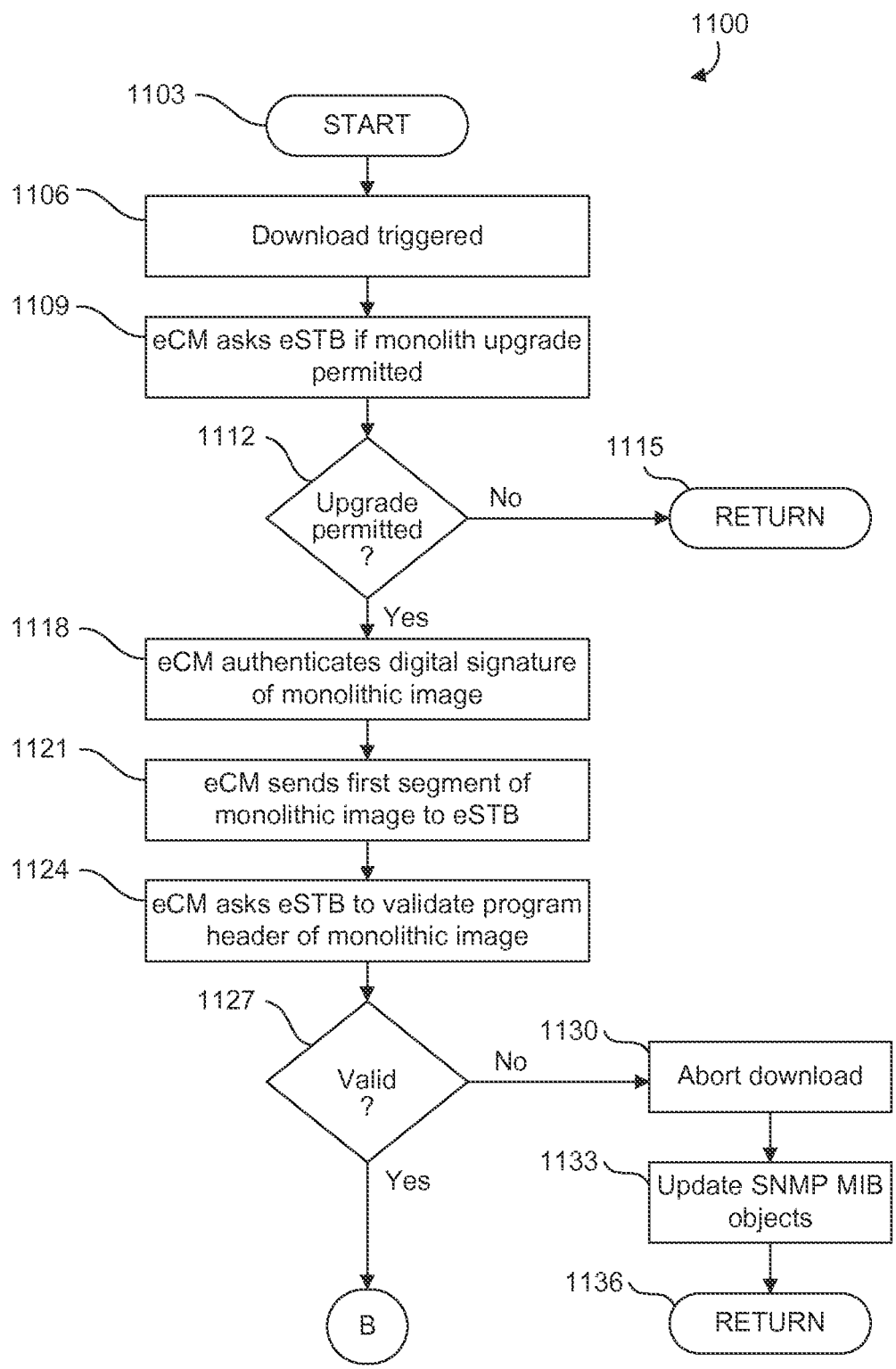
FIGS. 11A-11B are illustrated as flowcharts of the processing of FIG. 10.
Figure 11B:
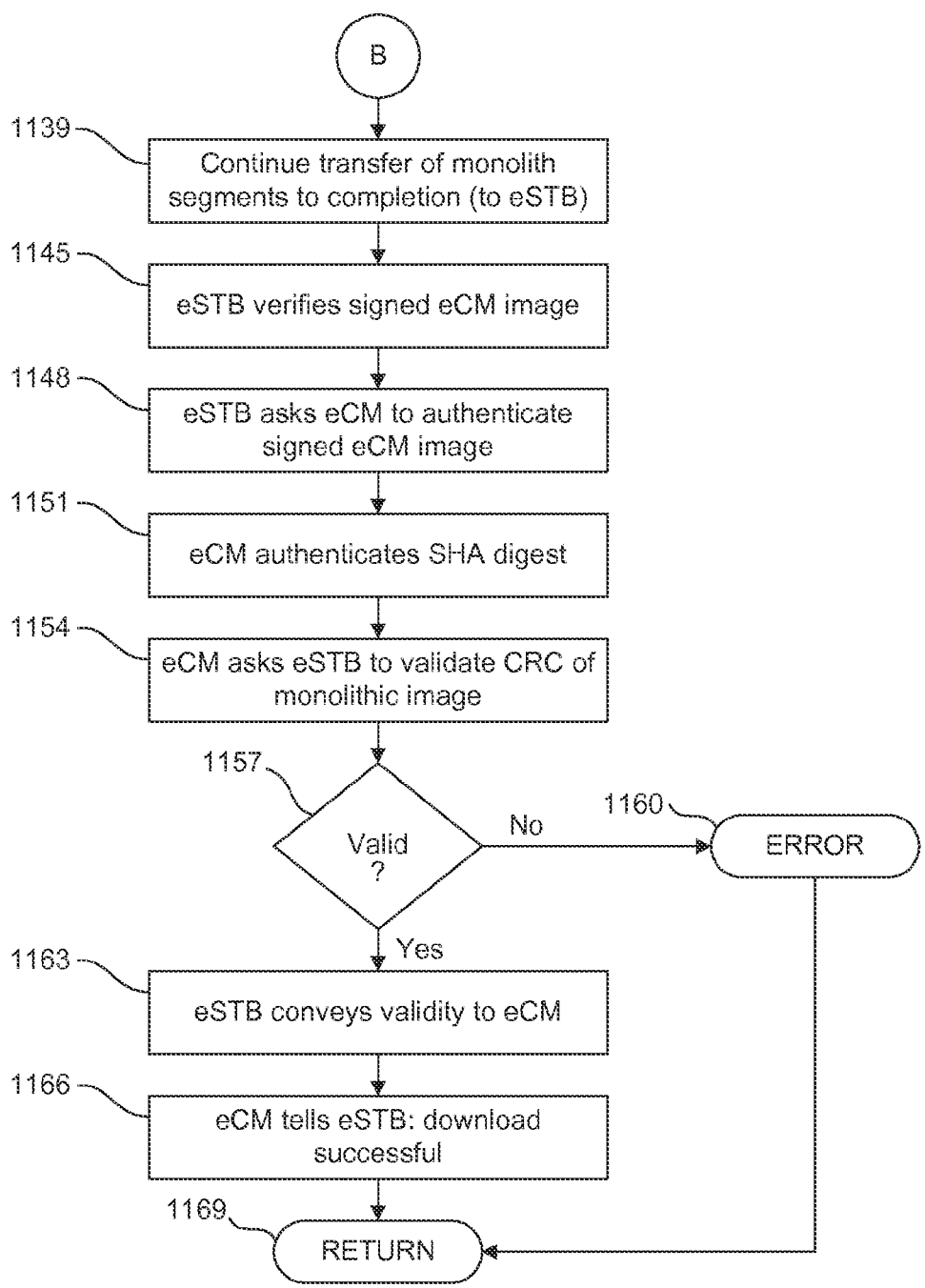

The processing of FIG. 10 is illustrated as flowcharts in FIGS. 11A-11B. The process begins at step 1103. In step 1106, the download is triggered. In step 1109, the eCM asks the eSTB if an upgrade of the software is permitted. If, in step 1112, an upgrade is not permitted, then the process concludes at step 1115. If the upgrade is permitted, then the process continues at step 1118. Here, the eCM authenticates the digital signature of the monolithic image. In step 1121, the eCM sends the first segment of the monolithic image to the eSTB.

In step 1124, the eCM asks the eSTB to validate the program header of the monolithic image. In step 1127, validity of the program header is determined. If the header is not valid, then in step 1130, the download is aborted. The SNMP MIB objects are then updated in step 1133, and the process concludes at step 1136. If the program header is found to be valid in step 1127, then the process continues at step 1139 in FIG. 11B. At step 1139 the transfer of segments of the monolithic image to the eSTB is continued to completion.

In step 1148, the eSTB asks the eCM to authenticate the signed eCM image. In step 1151, the eCM authenticates the SHA digest. In step 1154, the eCM asks the eSTB to validate the CRC of the monolithic image. If the image is found to be valid in step 1157, then in step 1163, the eSTB communicates the validity to the eCM. In step 1166, the eCM tells the eSTB that the download was successful. If it is determined in step 1157 that the monolithic image is not valid, then an error condition is raised in step 1160.

Figure 12:
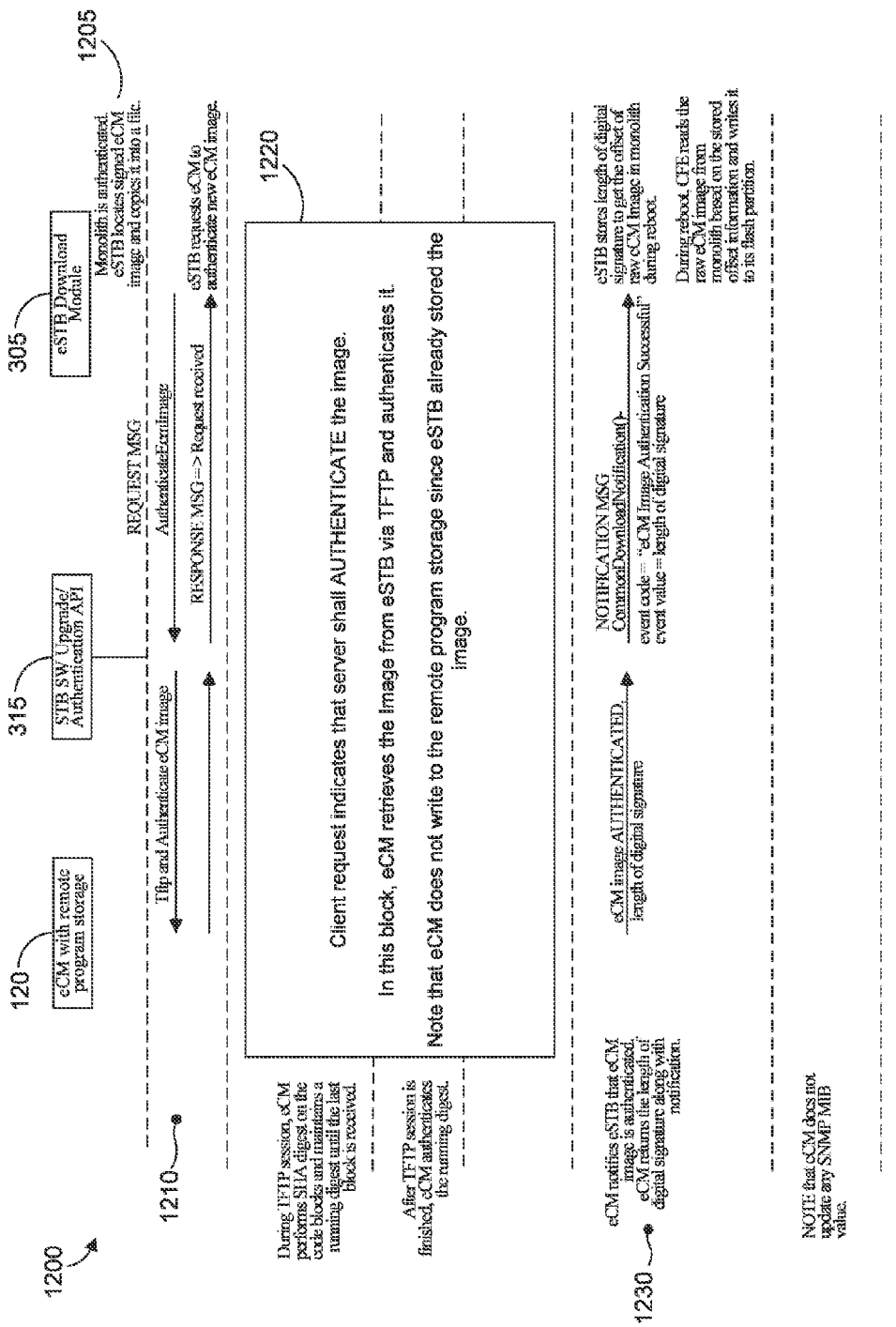
FIG. 12 illustrates the validation of a signed eCM code image, according to an embodiment of the invention.

The eSTB will then verify the signed eCM code image. Thus process is illustrated in FIG. 12, according to an embodiment of the invention. In step 1205, eSTB download module 305 locates the signed eCM code image in the monolithic image. In step 1210, eSTB download module 305 asks that eCM 120 authenticate the signed eCM code image. This takes the form of a REQUEST message sent via API 315. This message is acknowledged with a RESPONSE message that is received at eSTB download module 305. In step 1220, the REQUEST message indicates to eCM 120 (acting as a server) that the signed eCM image is to be authenticated. The eCM 120 retrieves the signed eCM image from eSTB download module 305 using TFTP and authenticates it. Since the REQUEST message indicates that the image is to be authenticated only and not be upgraded, eCM 120 does not write to the remote program storage at the eSTB.

In step 1230, eCM 120 notifies eSTB download module 305 that the signed eCM image is authenticated and returns the length of the digital signature to eSTB download module 305. This is received at eSTB download module 305 as a NOTIFICATION message. In an embodiment of the invention, the eSTB then stores this length and uses it to get the offset of the raw eCM image in the monolith during subsequent reboot.

Figure 13:
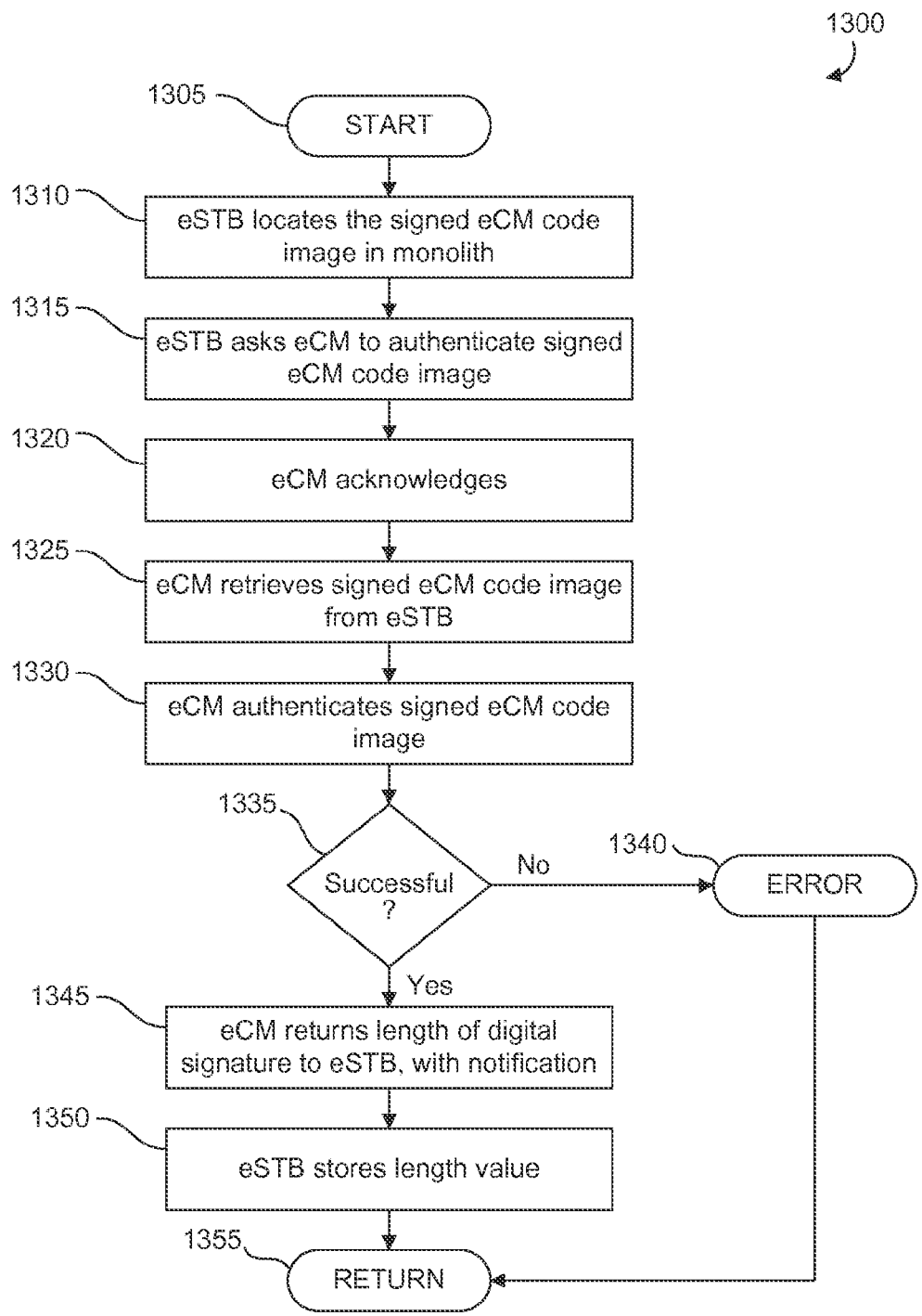
FIG. 13 is a flowchart illustrating the processing of FIG. 12, according to an embodiment of the invention.

FIG. 13 illustrates the processing of FIG. 12 as a flowchart. The process begins at step 1305. In step 1310, the eSTB locates the signed eCM code image in the monolith. In step 1315, the eSTB asks the eCM to authenticate the signed eCM code image. The eCM acknowledges the request in step 1320. In step 1325, the eCM retrieves the signed eCM code image from the eSTB. In step 1330, the eCM authenticates the signed eCM code image. If the authentication is found not to be successful in step 1335, then an error condition is raised in step 1340. If the authentication is successful, then the process continues in step 1345. Here, the eCM returns the length of the digital signature to the eSTB, along with notification of the success of the authentication. In step 1350, the eSTB stores the length. The process concludes at step 1355.

Figure 14:
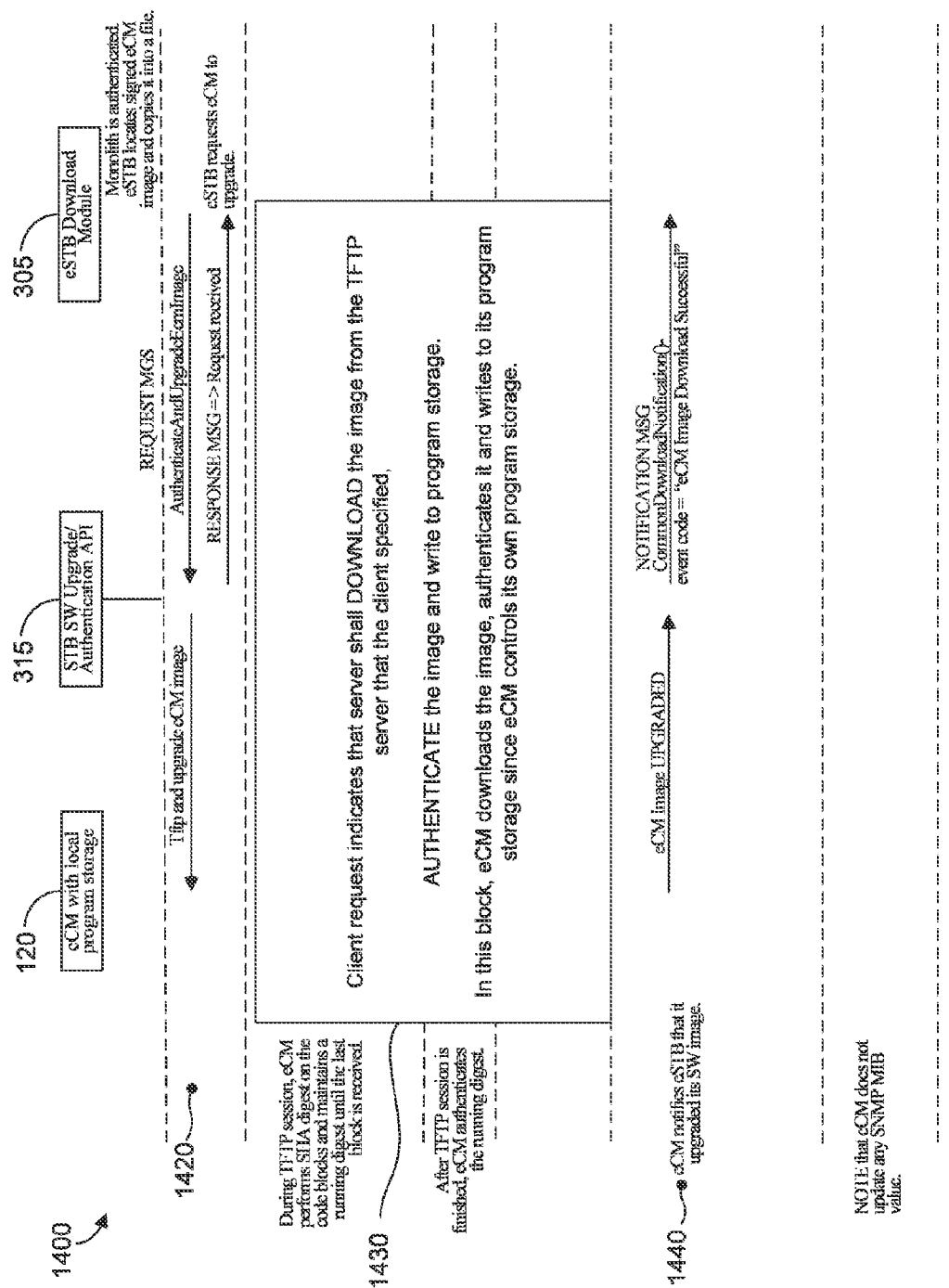
FIG. 14 illustrates processing related to the download process where the eCM has local flash memory, enabling it to store the downloaded monolithic code image locally, according to an embodiment of the invention.

The eCM 120 may have local flash memory, enabling it to store an eCM image locally. This is illustrated in FIG. 14, according to an embodiment of the invention. In step 1420, eSTB download module 305 requests that eCM 120 perform an image upgrade. This takes the form of a REQUEST message, sent via API 315. eCM 120 sends an acknowledgement, which is received by eSTB download module 305 in the form of a RESPONSE message. In step 1430, eCM 120 (acting as a server) downloads the signed eCM image from a TFTP server specified by the eSTB (acting as a client). eCM 120 downloads the image and authenticates it. The image is then written to program storage of eCM 120. This storage may be in the form of flash memory local to eCM 120 in an embodiment of the invention. In step 1440, eCM 120 informs eSTB download module 305 that the image of eCM 120 has been upgraded. This is received by the eSTB as a NOTIFICATION message.

Figure 15:
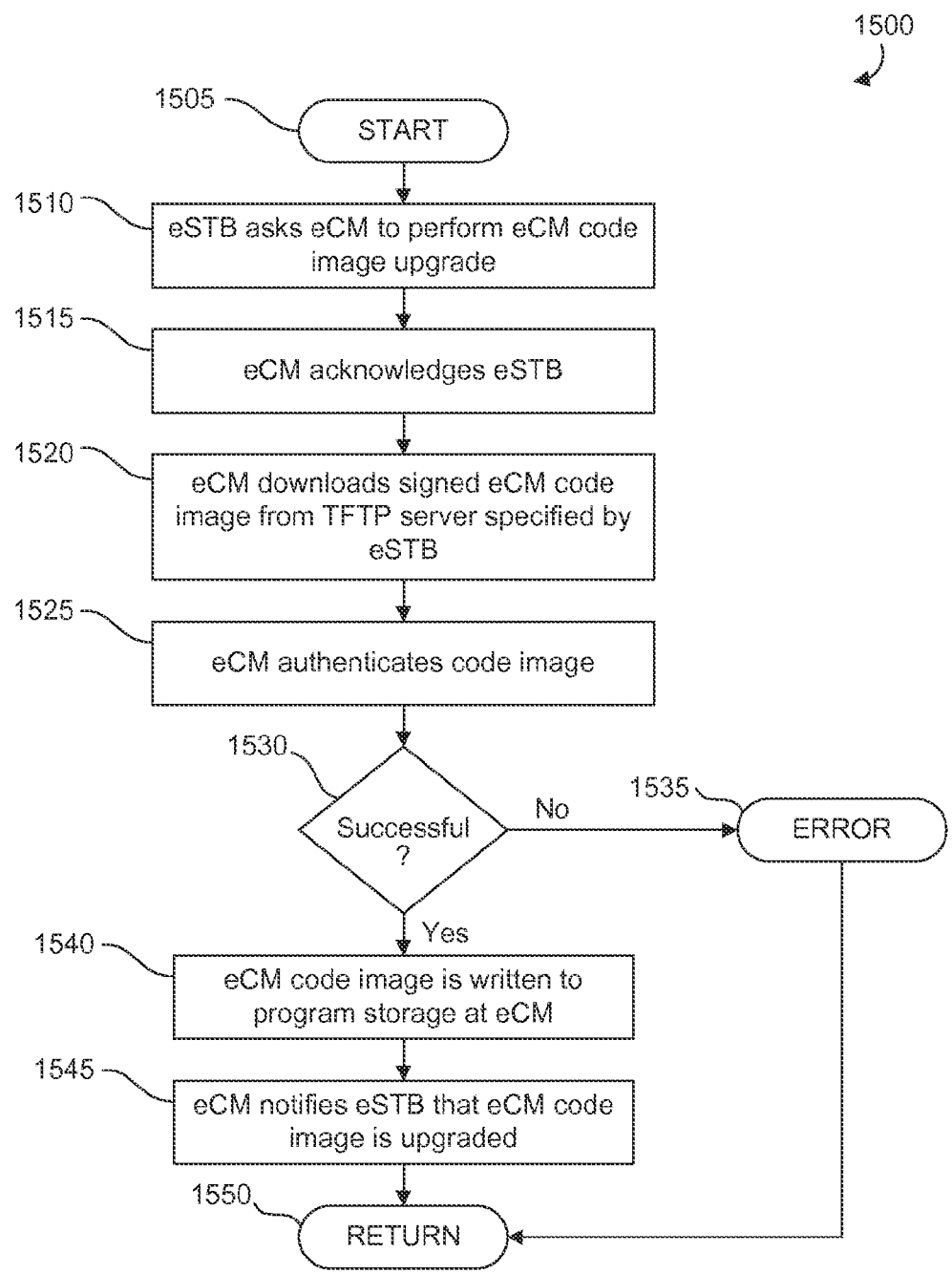
FIG. 15 is a flowchart illustrating the processing of FIG. 14, according to an embodiment of the invention.

The processing of FIG. 14 is illustrated as a flowchart in FIG. 15. The process begins at step 1505. In step 1510, the eSTB asks the eCM to perform the eCM code image upgrade. This is acknowledged by the eCM in step 1515. In step 1520, the eCM downloads the signed eCM code image from the TFTP server specified by the eSTB. The eCM performs the authentication process in step 1525. If this authentication is successful, the process continues at step 1540. Here, the eCM code image is written to program storage at the eCM, such as a flash memory. In step 1545, the eCM notifies the eSTB that the eCM code image has been upgraded. If the authentication is not successful (as determined in step 1530), then an error condition is raised in step 1535. The process concludes at step 1550.

The structure of REQUEST, RESPONSE, AND NOTIFICATION messages between eCM 120 and eSTB 130 is shown in FIGS. 16-18 respectively, according to an embodiment of the invention.

Note that while the above processes are described in terms of SHA-1 authentication, this is not meant to limit the scope of the invention; the concepts of the invention can also be implemented using other forms of authentication.

Moreover, the invention described above can be implemented using hardware, firmware, or software, or any combination thereof. Both hardwired logic and/or programmable logic may be used. In an embodiment of the invention, the eCM and eSTB may be microprocessor based, wherein the microprocessor(s) execute processing instructions that effect the messaging and operations discussed herein.

By leveraging the existing functionalities in the eCM and eSTB, this method avoids having all software upgrade functionality in both the eCM and eSTB. If the cable modem is running in standalone cable modem mode a software upgrade trigger will only upgrade cable modem software. If the cable modem is running in embedded cable modem mode, a software upgrade trigger will upgrade set-top device software. Furthermore, this system provides methods to upgrade the software of an eCM that is running in embedded cable modem mode since a software upgrade trigger sent in a DOCSIS channel will not upgrade eCM software alone.

Computing Context

Figure 19:
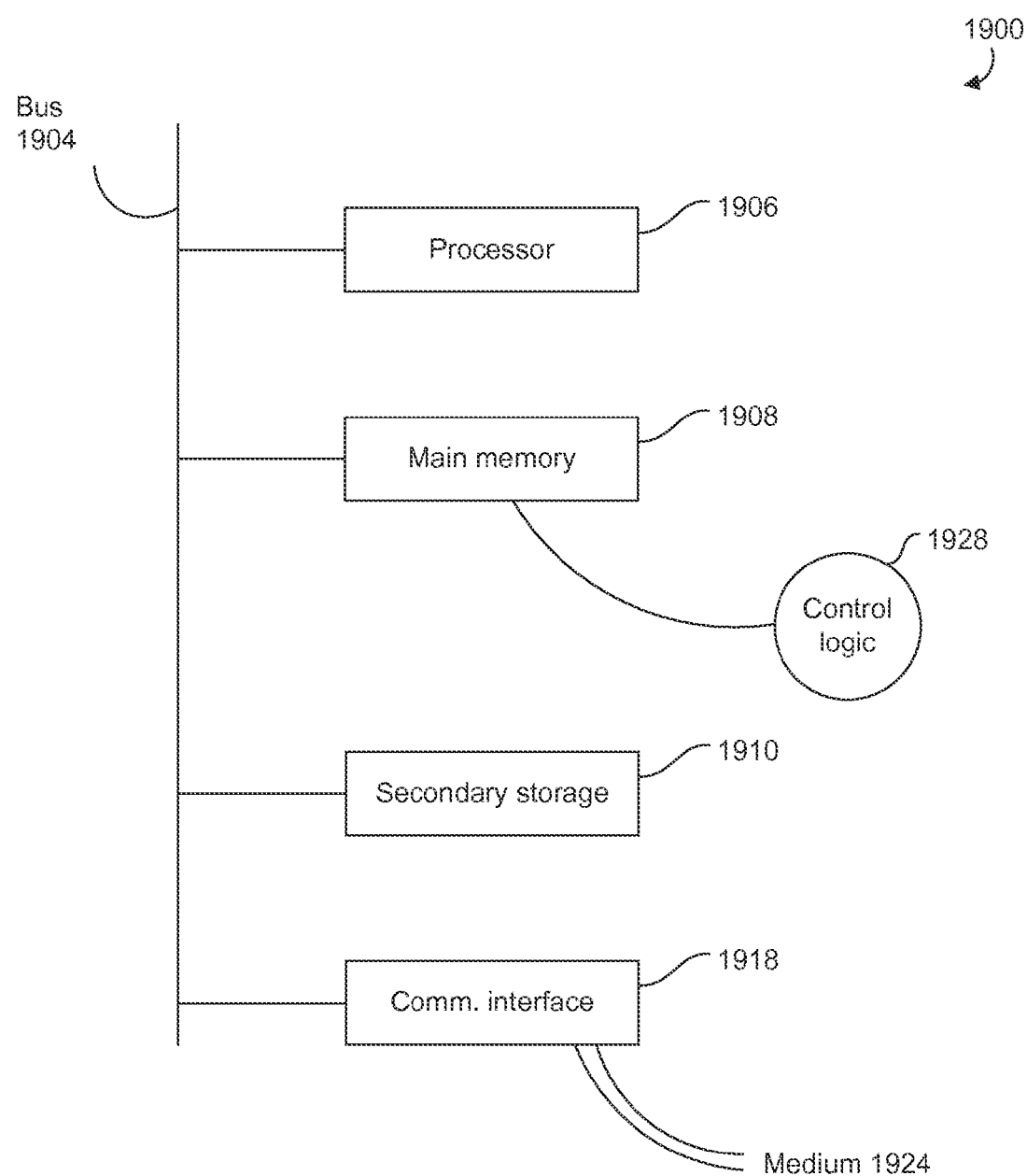
FIG. 19 is a block diagram illustrating the computing context of an embodiment of the invention.

In an embodiment of the present invention, the system and operation of the present invention described herein are implemented using a programmable processor at each of the eCM and eSTB. Such a processor is shown in FIG. 19. The processor 1906 is connected to a communication bus 1904. The processor 1906 may operate in conjunction with a main or primary memory 1908, such as random access memory (RAM). The primary memory 1908 has stored therein control logic 1928 (computer software), and data. Control logic 1928 may include the images discussed above The processor 1906 may also interoperate with one or more secondary storage devices 1910. The secondary storage device 1910 may comprise, for example, a removable storage device or other read/writable memory device. Device 1910 may include a computer useable or readable storage medium having stored therein (or capable of storing therein) computer control logic 1928 and/or data.

The processor 1906 further operates with a communication or network interface 1918. The interface 1918 enables the processor 1906 to communicate with remote devices. For example, the interface 1918 allows the processor 1906 to communicate over communication network or medium 1924 (representing a form of a computer useable or readable medium), such as LANs, WANs, the Internet, etc. The interface 1918 may interface with remote sites or networks via wired or wireless connections.

In particular, control logic 1928 may be transmitted to and main memory 1908 via the communication medium 1924. More particularly, the illustrated system may receive and transmit carrier waves (electromagnetic or optical signals) modulated with control logic 1928 via the communication medium 1924. In particular, in the context of an eCM, medium 1924 can serve to convey the messages and images (or portions thereof) to and from the eSTB and/or a headend server. Analogously, in the context of an eSTB, medium 1924 can serve to convey the messages and images (or portions thereof) to and from the eCM and/or a headend server.

Any apparatus or manufacture comprising a computer useable or readable medium having control logic (software) stored therein is referred to herein as a computer program product or program storage device. This includes, but is not limited to, the main memory 1908 and the secondary storage 1910. Such computer program products, having control logic stored therein that, when executed by one or more data processing devices, cause such data processing devices to operate as described herein, represent embodiments of the invention. Control logic 1928 may also be sent to system 1900 using carrier waves modulated with the control logic.

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Abstract section, is intended to be used to interpret the claims. The Abstract section may set forth one or more but not all exemplary embodiments of the present invention as contemplated by the inventor, and thus, are not intended to limit the present invention and the appended claims in any way.

The present invention has been described above with the aid of functional building blocks illustrating the implementation of specified functions and relationships thereof, The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and, guidance.

The breadth and scope of the present invention should not be limited by any of the above-described exemplary embodiments, but should be defined only in accordance with the claims and their equivalents.

What is claimed is:

1. A method, comprising:
    requesting, at a first device, that a second device determine whether a software upgrade comprising a monolithic code image is permitted;
    authenticating a digital signature of the monolithic code image;
    sending a first segment of the monolithic code image to the second device, wherein the first segment comprises a header of the monolithic code image;
    requesting the second device to validate the header;
    receiving a validation of the header from the second device;
    sending the monolithic code image to the second device; and
    requesting the second device to validate the monolithic code image.

2. The method of claim 1, wherein the step of requesting the second device to validate the monolithic code image comprises sending a cyclic redundancy code (CRC) of the monolithic code image to be validated at the second device.

3. The method of claim 1, further comprising:
    locating a first device code image in the monolithic code image;
    authenticating the first device code image; and
    sending a length of a digital signature of the first device code image to the second device.

4. The method of claim 1, further comprising:
    receiving a request, from the second device, to authenticate a signed code version table (CVT);
    authenticating the signed CVT; and
    returning, to the second device, a length of a digital signature of the signed CVT to allow the second device to find the start of a CVT file in the signed CVT.

5. The method of claim 4, further comprising:
receiving a request from the second device to process a Code Verification Certificate (CVC);
validating settings of the CVC after decoding the CVC;
after validation of the settings, storing the settings of the CVC; and
sending a length of the CVC to allow the second device to locate a next CVC in the signed CVT.

6. The method according to claim 1, further comprising:
receiving a request, from the second device, to authenticate a signed code version table (CVT),
authenticating the signed CVT, and
returning, to the second device, a length of a digital signature of the signed CVT to allow the second device to find the start of a CVT file in the signed CVT before determining at the second device whether a software upgrade is permitted.

7. The method according to claim 4, further comprising:
receiving a request from the second device to process a Code Verification Certificate (CVC),
validating settings of the CVC after decoding the CVC,
after validation of the settings, storing the settings of the CVC, and
sending a length of the CVC to allow the second device to locate a next CVC in the signed CVT before determining at the second device whether the software upgrade is permitted.

8. The method according to claim 1, wherein the requesting is triggered by a configuration file or via Simple Network Management Protocol (SNMP).

9. The method according to claim 4, wherein the authenticating the signed CVT comprises:
parsing a secure download header of the signed CVT;
authenticating the secure download header using security certificates stored on the first device;
performing a Secure Hashing Algorithm (SHA) digest process on remaining contents of the signed CVT; and
authenticating a SHA digest code of the SHA digest process.

10. The method of claim 1, further comprising:
performing a running Secure Hashing Algorithm (SHA) digest process on code blocks of the monolithic code image; and
authenticating the running SHA digest process.

11. A system, comprising:
a network interface configured to communicate with a second device;
a memory; and
a processor coupled to the memory and the network interface, wherein the processor is configured to:
request the second device to determine whether a software upgrade comprising a monolithic code image is permitted,
authenticate a digital signature of the monolithic code image,
send a first segment of the monolithic code image to the second device, wherein the first segment comprises a header of the monolithic code image,
request the second device to validate the header,
receive a validation of the header from the second device,
send the monolithic code image to the second device, and
request the second device to validate the monolithic code image.

12. The system of claim 11, wherein the processor is further configured to request the second device to validate a cyclic redundancy code (CRC) of the monolithic code image.

13. The system of claim 11, wherein the processor is further configured to:
locate a device code image in the monolithic code image,
authenticate the device code image, and
send a length of a digital signature of the device code image to the second device.

14. The system of claim 11, wherein the processor is further configured to:
receive a request, from the second device, to authenticate a signed code version table (CVT),
authenticate the signed CVT, and
return, to the second device, a length of a digital signature of the signed CVT to allow the second device to find the start of a CVT file in the signed CVT.

15. The system of claim 14, wherein the processor is further configured to:
receive a request from the second device to process a Code Verification Certificate (CVC),
validate settings of the CVC after decoding the CVC,
after validating the settings, store the settings of the CVC in the memory, and
send a length of the CVC to allow the second device to locate a next CVC in the signed CVT.

16. The system of claim 11, wherein the processor is further configured to:
receive a request, from the second device, to authenticate a signed code version table (CVT),
authenticate the signed CVT, and
return, to the second device, a length of a digital signature of the signed CVT to allow the second device to find the start of a CVT file in the signed CVT before determining at the second device whether the software upgrade is permitted.

17. The system of claim 14, wherein the processor is further configured to:
receive a request from the second device to process a Code Verification Certificate (CVC),
validate settings of the CVC after decoding the CVC,
after validating the settings, store the settings of the CVC, and
send a length of the CVC to allow the second device to locate a next CVC in the signed CVT before determining at the second device whether the software upgrade is permitted.

18. The system of claim 11, wherein the requesting the second device to determine whether the software upgrade is permitted is triggered after receiving, by the receiver, a configuration file or a Simple Network Management Protocol (SNMP) message.

19. The system of claim 14, wherein the processor is further configured to:
parse a secure download header of the signed CVT;
authenticate the secure header using security certificates stored in the memory;
perform a Secure Hashing Algorithm (SHA) digest process on remaining contents of the signed CVT; and
authenticate a SHA digest code of the SHA digest process.

20. The system of claim 11, wherein the processor is further configured to:
perform a running Secure Hashing Algorithm (SHA) digest process on code blocks of the monolithic code image; and
authenticate the running SHA digest process.

* * * * *